W. H. Henshall.
Boring Tube Holes.

Nº 67,194.  Patented Jul. 30, 1867.

Witnesses:
Frank Gordr
Morgan W. Jellett

Inventor:
William H. Henshall
per Francis D. Cattonius
Attorney

United States Patent Office.

WILLIAM H. HENSHALL, OF PHILADELPHIA, PENNSYLVANIA.

Letters Patent No. 67,194, dated July 30, 1867.

IMPROVED TUBE-HOLE CUTTER.

*The Schedule referred to in these Letters Patent and making part of the same.*

TO ALL WHOM IT MAY CONCERN:

Be it known that I, WILLIAM H. HENSHALL, of the city and county of Philadelphia, and State of Pennsylvania, have invented a new and improved Tube-Hole Cutter; and I do hereby declare that the following is a full, clear, and exact description of the same, reference being had to the accompanying drawing, and to the letters of reference marked thereon, making part of this specification, in which—

Figure 3:
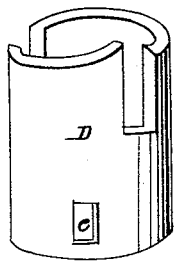
Figure 1:
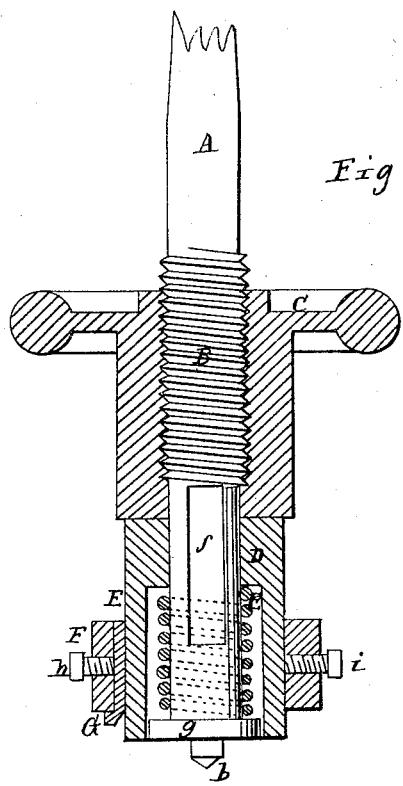
Figure 2:
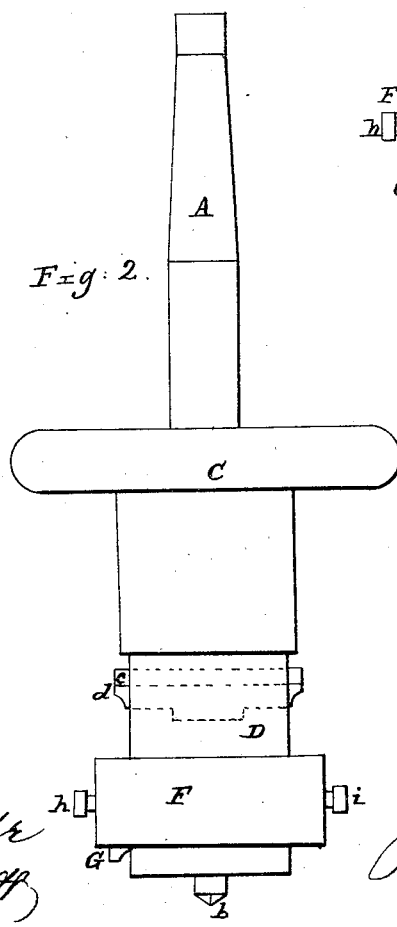

Figure 1 is a sectional elevation,
Figure 2 a plain elevation, and
Figure 3 a perspective view of the cutter.

Similar letters refer to similar parts in the several views.

A is a spindle, having at one end a centre, $b$, which is either formed to it or inserted into a socket in its end, the other end being formed for setting in the spindle of a drill-press. B is a left-hand screw cut for a proportionate distance on the spindle. C is a feed-wheel threaded to fit the screw B. D is a hollow cylindrical cutter with two internal diameters, the lesser one fitting snugly the spindle A. It has radial teeth cut round its circumference, as shown fig. 3, and is secured to the spindle by the gib and cutter $c\ d$ set in the key-ways $e$ and the slot $f$ in the spindle, in such manner that while the cutter rotates with the spindle it is permitted to raise and lower on it by the gib and cutter sliding freely in the slot $f$, which is made of a length corresponding to the thickness of the washer the cutter is required to cut out. E is a spiral spring contained in the greater recess of the cutter encircling the spindle, its ends being enclosed between the top of the recess and the fixed collar $g$ on the end of the spindle. An adjusting-ring, F, is slipped over the cutter D, and is held in place by set-screws $h\ i$, one of which holds in place the countersink-tool G, which is contained in an opening formed in the ring, by pressing it firmly against the surface of the cutter, its inner surface being rounded to correspond with that of the cutter.

My improved tool is for cutting out the tube-holes in the tube-sheets of boilers. To do this it is not requisite that a hole should be previously made in the sheet, as with other borers or cutters. It is simply necessary to lay off the centres of the holes, which are afterwards centre-punch marked, and adjust the ring F at a distance above the teeth of the cutter about equal to the thickness of the sheet. The spindle A is inserted into the spindle of a drill-press, and the tube-sheet fixed on the table of the same, and adjusted that either of the centre-punch marks may be directly beneath the centre $b$. The spindle of the press is then screwed down until the centre takes into it. On starting the press, the operator holds the feed-wheel C from turning. The screw B being left-handed, causes it to screw down, forcing the teeth of the cutter D into the work. As the cutter revolves and feeds it compresses the spring E until it has cut a channel or ring through the plate, removing a circular piece or washer, which sticks to it. The feed-wheel C is reversed, removing its pressure from the cutter, at which instant the spring E opens and lifts the cutter from the sheet and forces the washer from it. The tool G can be made to countersink the sheet at the same operation, if it is to be on the side drilled from. After the plate or washer has been removed, burrs or ragged edges often remain on the under side of the sheet. They are removed by filing.

I do not confine myself to a left-hand screw on the spindle, but will use either right or left, as the case may require.

What I claim as my invention, and desire to secure by Letters Patent, is—

1. The improved tool as a whole, constructed and arranged as herein shown and described.

2. The combination of the cutter D, adjusting collar F, and the countersink-tool G, constructed and arranged as shown and described.

3. The combination of the threaded spindle A, feed-wheel or nut C, spiral spring E, collar $g$, and the cutter D, constructed and arranged as shown and described.

In testimony whereof I hereunto sign my name to this specification in presence of two subscribing witnesses.

WILLIAM H. HENSHALL.

Witnesses:
 FRANCIS D. PASTORIUS,
 W. W. DOUGHERTY.